Figure 1:
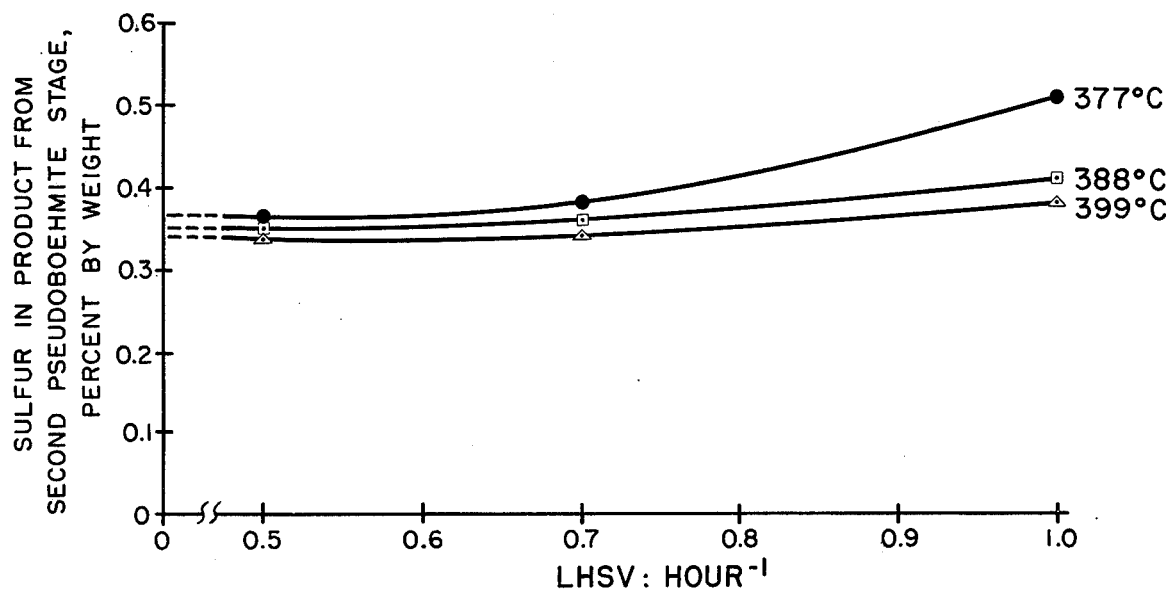

United States Patent [19]

Beuther et al.

[11] 3,940,330
[45] Feb. 24, 1976

[54] TWO STAGE METAL-CONTAINING OIL HYDRODESULFURIZATION PROCESS EMPLOYING AN ACTIVATED ALUMINA SUPPORTED CATALYST IN EACH STAGE

[75] Inventors: Harold Beuther, Gibsonia; Sun W. Chun, Murrysville; Angelo A. Montagna, Monroeville, all of Pa.

[73] Assignee: Gulf Research & Development Company, Pittsburgh, Pa.

[22] Filed: Apr. 24, 1974

[21] Appl. No.: 463,620

[52] U.S. Cl. ............................... 208/210; 208/216
[51] Int. Cl.² ..................................... G10G 23/02
[58] Field of Search ............... 208/210, 89, 116, 97

[56] References Cited
UNITED STATES PATENTS

| | | | |
|---|---|---|---|
| 3,242,101 | 3/1966 | Erickson et al. | 208/216 |
| 3,322,666 | 5/1967 | Beuther et al. | 208/216 |
| 3,340,180 | 9/1967 | Beuther et al. | 208/216 |
| 3,472,759 | 10/1969 | Masologites et al. | 208/97 |

*Primary Examiner*—Delbert E. Gantz
*Assistant Examiner*—G. J. Crasanakis

[57] ABSTRACT

A two-stage process for hydrodesulfurization of a metal-containing hydrocarbon oil employing a hydrodesulfurization catalyst in each stage having an activated support prepared by drying and calcining a crystalline alumina containing 1.2 to 2.6 mols of water of hydration per mol of alumina.

15 Claims, 6 Drawing Figures

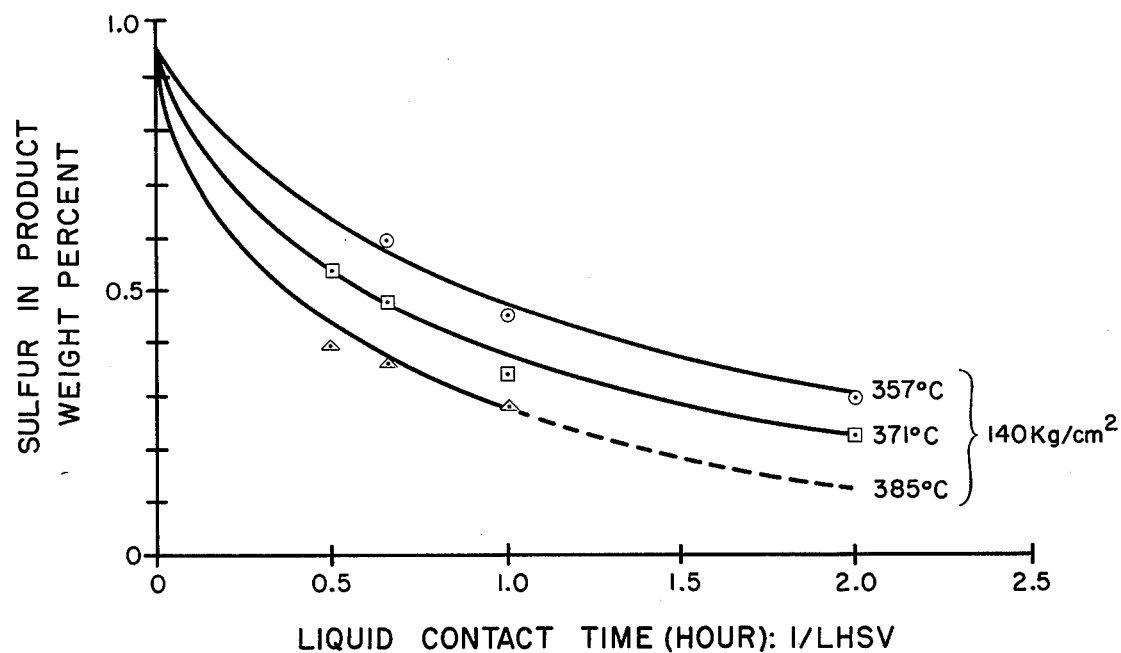
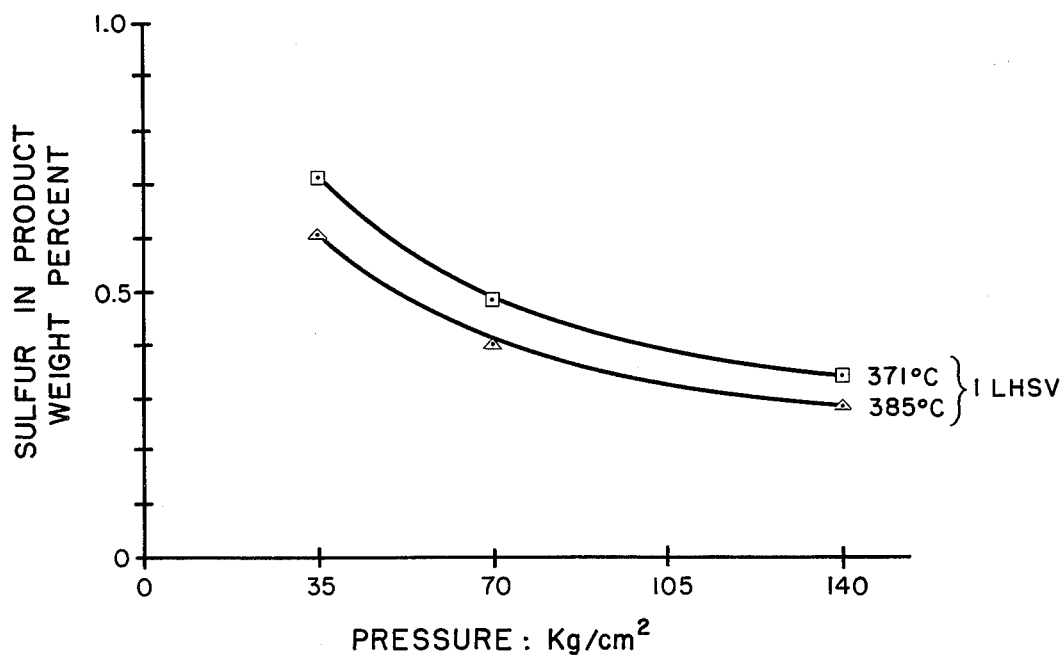

TWO STAGE METAL-CONTAINING OIL HYDRODESULFURIZATION PROCESS EMPLOYING AN ACTIVATED ALUMINA SUPPORTED CATALYST IN EACH STAGE

This invention relates to the use of activated alumina supported hydrodesulfurization catalysts in at least two reactor stages in series for the processing of asphaltenead metal-containing crude or residual petroleum oils. The invention applies to treatment of metal-containing hydrocarbon oils generally, so that synthetic oils such as coal liquids, shale extracts and tar sand bitumens can also be treated. The activated alumina employed is referred to herein as pseudoboehmite alumina.

The pseudoboehmite support for the catalysts of this invention has a pore volume and average pore diameter which is lower than that of alumina supports of prevailing commercial crude or residual oil hydrodesulfurization catalysts. It would be expected that these characteristics would tend to reduce the useful life in hydrodesulfurization service when treating metal-containing oils, since metals deposition results in filling and plugging of pores, thereby tending to deactivate small pore volume and small average pore diameter catalysts more readily than large pore volume and large average pore diameter catalysts.

In accordance with the present invention it has been discovered that pseudoboehmite supported catalysts unexpectedly exhibit higher desulfurization activity than prevailing commercial hydrodesulfurization catalysts having a larger pore volume and average pore diameter when the pseudoboehmite catalysts are utilized according to the process of this invention. The present invention relates to a process wherein pseudoboehmite supported catalysts can be effectively employed at a high hydrodesulfurization activity for long throughput durations when treating oils having a high metals content, that is, nickel and vanadium metals levels of at least 20, or 100, 200 or 250 parts per million by weight, or more, by operating the process in a manner which causes the pseudoboehmite to resist demetallization of the feed oil.

The catalyst of the present invention is characterized as a Group VI-B and Group VIII metall hydrodesulfurization catalyst supported on alumina wherein all or a major proportion of the alumina support is derived from a crystalline precursor alumina hydrate containing between about 1.2 and 2.6 mols of water of hydration per mol of alumina prior to calcining. The alumina support is essentially free of constituents which tend to impart cracking activity. Therefore, it contains less than 1 weight percent of silica, preferably less than 0.5 weight percent of silica, and can be essentially free of silica. The precursor hydrate can comprise pseudoboehmite entirely or in major part, with the remainder comprising other alumina hydrates, such as bayerite and/or gibbsite, which are trihydrates. Pseudoboehmite and its method of preparation is disclosed in U.S. Pat. Nos. 3,188,174 and 3,222,273, which are hereby incorporated by reference.

The pseudoboehmite alumina supported catalysts of this invention have been subjected to comparative tests against various commercial catalysts, all of which were supported on alumina which is free of pseudoboehmite. The pseudoboehmite-free aluminas were either derived entirely from a boehmite precursor, which is crystalline alumina monohydrate, or were derived from a precursor comprising boehmite in minor proportion together with bayerite in major proportion.

The operating conditions employed in each stage of the process of this invention comprise a temperature in the range from about 600° to about 1,000°F. (316° to about 538°C.) and preferably from about 650° to about 800°F. (343° to about 427°C.). The liquid space velocity can be in the range from about 0.1 to about 10.0, preferably less than about 5.0 and more preferably from about 0.2 to about 3.0 volumes of feed oil per volume of catalyst per hour. The hydrogen feed rate employed ranges from about 500 to about 10,000 standard cubic feet per barrel of feed stock (9 to about 180 SCM/100L), preferably ranges from about 1,000 to 8,000 standard cubic feet per barrel (18 to 144 SCM/100L) and more preferably ranges from about 2,000 to about 6,000 standard cubic feet per barrel (36 to about 108 SCM/100L). The hydrogen partial pressure is in the range from about 50 to about 2,500 psi (3.5 to 175 $Kg/cm^2$), preferably is less than about 2,000 psi (140 $Kg/cm^2$) and more preferably is less than about 1,500 psi (105 $Kg/cm^2$). The total pressure does not greatly exceed the hydrogen partial pressure and can extend up to about 2,800 psi (196 $Kg/cm^2$), but preferably the total pressure is less than about 2,200 psi (154 $Kg/cm^2$).

The catalyst of the present invention comprises a minor proportion of metalliferous hydrogenating components, including Group VI-B and Group VIII metals, their oxides and sulfides, composited with pseudoboehmite alumina. Titanium promotion can suitably be employed. The preferable hydrogenating components are nickel, cobalt, platinum, palladium, molybdenum and tungsten. Preferred catalysts contain cobalt and molybdenum or nickel, cobalt and molybdenum or nickel, titanium and molybdenum.

The alumina carrier or support for the catalyst of this invention can be also a mixture of two different aluminas obtained by mechanically blending two different crystalline alumina hydrate precursors, one of which is an alumina trihydrate while most of the alumina is pseudoboehmite, i.e., a crystalline alumina hydrate containing from about 1.2 to about 2.6 mols of water of hydration per mol of $Al_2O_3$. For example, the alumina trihydrate can be employed in an amount from about 1 percent to about 35 percent weight, while the remainder can be pseudoboehmite. In order to improve desulfurization activity, the alumina trihydrate can comprise 2 or 5 up to 18 or 30 percent by weight, based upon total alumina hydrate precursor. In this regard, see U.S. Pat. No. 3,846,285 particularly Table V, which application is hereby incorporated by reference. This patent application shows these hydrates can be synthesized as a mixture.

The pseudoboehmite catalyst support of this invention is capable of hydrodesulfurizing a metals-containing residual oil with relatively low metals pick-up and therefore has superior aging characteristics providing extended catalyst life and, unexpectedly, is regenerable, i.e., relatively fresh catalyst activity can be achieved upon regeneration. The superior regenerability of the pseudoboehmite catalyst is illustrated in the aforesaid incorporated U.S. Pat. No. 3,846,285.

Regeneration of the pseudoboehmite catalysts of this invention can be accomplished either by solvent extraction with an aromatic solvent, preferably one containing a good hydrogen transfer agent, such as hydrofuran and anthracene, or by oxidative burn-off. The solvent extraction can be accomplished in the presence of at least about 500 standard cubic feet of hydrogen per barrel (9 SCM/100L) of solvent, at pressures of about 250 psi (17.5 Kg/cm$^2$) or greater and at temperatures of about 500°F. (260°C.) or greater. The liquid hourly space velocity employed is usually greater than about 0.1 volume of solvent per volume of catalyst per hour. Somewhat more severe conditions are employed for the subsequent catalytic treatment of the solvent itself, such as pressures of at least about 500 psi (35 Kg/cm$^2$) and advantageously greater than about 1,000 psi (70 Kg/cm$^2$), temperatures of at least about 700°F. (371°C.), hydrogen feed rates of at least about 1,000 standard cubic feet per barrel (18 SCM/100L) of solvent and liquid hourly space velocities of at least about 0.2 volumes of solvent per volume of catalyst per hour. Generally, however, there is no advantage in employing pressures greather than about 3,000 or 4,000 psi (210 to 280 Kg/cm$^2$), temperatures greater than about 900°F. (482°C.), space velocities greater than about 2.0 or hydrogen feed rates greater than about 10,000 standard cubic feet per barrel (180 SCM/100L). Normally, the regeneration by solvent treatment is accomplished within about 20 to 30 hours. The oxidative burn-off can be accomplished by techniques well known in the art. Preferably, the temperature is maintained at a level of 800°F. (427°C.) or lower.

Tests are presented below demonstrating the activity of the pseudoboehmite catalyst of this invention for hydrodesulfurization of a Ceuta atmospheric tower bottoms. The Ceuta reduced crude feed contained the unusually high level of 292 parts per million by weight of nickel and vanadium. Table 1 shows the characteristics of a typical Ceuta reduced crude feed oil charged to the first pseudoboehmite catalyst stage of the process of this invention.

TABLE 1

| Ceuta Atmospheric Tower Bottoms Feed to First Stage | |
|---|---|
| Gravity, °API | 18.2 |
| Nitrogen, weight % | 0.32 |
| Nickel, ppm weight | 34 |
| Vanadium, ppm weight | 258 |
| Pour Point, °F. | +45 (7°C.) |
| Sulfur, weight % | 2.12 |
| Carbon Residue Rams, weight % | 8.39 |
| Viscosity, SUS 100°F. (38°C.) | 2867 |
| Viscosity, SUS 210°F. (99°C.) | 140.3 |
| Carbon, weight % | 85.76 |
| Hydrogen, weight % | 11.58 |
| Heat of Comb., BTU/LB | 18,770 |

TABLE 1-continued

| Ceuta Atmospheric Tower Bottoms Feed to First Stage | |
|---|---|
| | (10,323 cal/gm) |
| Oxygen, weight % | 0.32 |
| Distillation, Vacuum, 1 mm | |
| Percent Cond. at 760 mm, °F. | |
| 5 | 635 (335°C.) |
| 10 | 677 (353°C.) |
| 20 | 748 (388°C.) |
| 30 | 812 (433°C.) |
| 40 | 870 (466°C.) |
| 50 | 942 (506°C.) |
| 60 | 1058 (570°C.) |
| 70 | 1087 (587°C.) |

The Ceuta atmospheric tower bottoms were desulfurized over the pseudoboehmite supported catalyst in a first stage to remove 75 weight percent sulfur and 40 weight percent nickel plus vanadium. This product was then flashed to remove by-product gases, such as hydrogen sulfide, ammonia and light hydrocarbons and was passed over a second stage pseudoboehmite catalyst bed with fresh hydrogen under various severities where second stage products having a sulfur level as low as 0.34 weight percent were produced with the remarkable feature that essentially no futher metal removal occurred. Table 2 shows the analyses of the products obtained from the first and second stages.

TABLE 2

| | Ceuta ATB | Product From First Pseudoboehmite Stage | Products From Second Pseudoboehmite Stage | | | |
|---|---|---|---|---|---|---|
| Conditions: | | | | | | |
| Hydrogen Pressure, psi | | 1,000 (70 Kg/cm$^2$) | 1,000 (70 Kg/cm$^2$) | 1,000 (70 Kg/cm$^2$) | 1,000 (70 Kg/cm$^2$) | 1,000 (70 Kg/cm$^2$) |
| Temperature: °F. | | 720 (382°C.) | 700 (371°C.) | 710 (377°C.) | 750 (399°C.) | 750 (399°C.) |
| LHSV: Hr$^{-1}$ | | 0.5 | 1 | 0.5 | 1 | 0.5 |
| Product Analyses: | | | | | | |
| Gravity: °API | 18.2 | 21.5 | 21.9 | 22.2 | 21.7 | 22.3 |
| Hydrogen: % by wt. | 11.58 | 12.15 | 12.3 | 12.29 | 12.21 | 12.29 |
| C$_5$ Insol.: % by wt. | | 8.51 | 2.92 | 5.50 | 6.36 | 7.41 |
| Sulfur: % by wt. | 2.12 | 0.57 | 0.51 | 0.37 | 0.38 | 0.34 |
| Ni + V: ppm | 292 | 159 | 150 | 146 | 161 | 151 |
| Desulfurization: % by wt. | | 75 | 10.5 | 35.1 | 33.3 | 40.4 |
| Demetallization: | | | | | | |
| % Ni+V wt. | | 40 | 6 | 8 | 0 | 5 |
| %Demetallization/ %Desulfurization | | 0.56 | 0.57 | 0.23 | 0 | 0.12 |

Table 2 indicates that surprisingly at temperatures above 710°F.(377°C.) little desulfurization benefit can be derived by operating the second stage at a low LHSV, Table 2 therefore shows that the pseudoboehmite supported catalyst releases the process from the requirement of low space velocity as required by conventional non-pseudoboehmite catalysts.

Table 2 also shows that demetallization in the second stage when employing the pseudoboehmite catalyst is greatly reduced at process temperatures above 710°F. (377°C.), especially when the LHSV is above 0.5.

Figure 5:
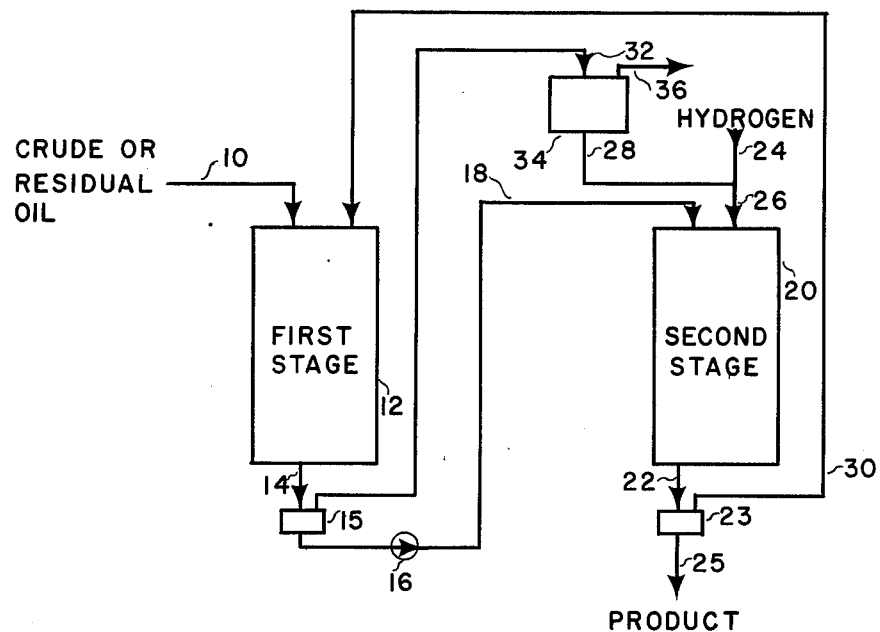

FIGS. 1 through 4 and 6 present graphs of data illustrating use of a pseudoboehmite catalyst and FIG. 5 presents a particular process flow diagram of the invention, FIG. 1 shows the effect of temperature and space velocity in a pseudoboehmite second stage which treats the product from a pseudoboehmite first stage. FIG. 1 illustrates the surprising effect that in the second pseudoboehmite state high desulfurization levels are achieved at temperatures above 710°F. (377°C.) when employing a high LHSV within the range 0.5 to 1. However, at a temperature of 710°F. (377°C.), a high desulfurization level requires a relatively low LHSV, which is to be expected. Since the data of Table 2 show that high temperatures and high space velocities are also conducive to low metal removal rates, it is advantageous to at least start-up a second stage cycle with a higher temperature than is employed in the first stage. The second stage temperature can remain higher than the first stage temperature throughout the cycle. The fact that the pseudoboehmite catalyst in the second stage at a temperature above 710°F. (377°C.) can release the second stage from a space velocity constraint is a highly unusual feature of this invention.

Table 2 and FIG. 1 together show the importance of elevated second stage start-of-run temperatures, above the start-of-run temperature of the first stage, and of elevated space velocity, in accomplishing high sulfur removal levels in the second stage, particularly when both stages employ a pseudoboehmite catalyst support. In the graph of FIG. 1, best sulfur removal levels (and, as shown in Table 2, lowest metal removal rates) are achieved at 750°F. (399°C.) and at 1 space velocity. At this temperature and space velocity, the suflur removal rate is the highest (and, as shown in Table 2, the metal removal rate is the lowest) of any point in the graph of FIG. 1. By contrast, use of the process temperature of 710°F. (377°C.) and the space velocity of 0.5 shown in FIG. 1, resulted in an inferior sulfur removal rate (and, as shown in Table 2, a higher metal removal rate). It is again emphasized that it is unusual that use of elevated liquid hourly space velocities does not reduce sulfur removal levels significantly from the levels achievable at lower space velocities at temperatures near 750°F. (399°C.). Therefore, second stage temperatures of 710° or 715° to 750°F. (377° or 379° to 399°C.), or higher, are advantageous, with space velocities above 0.5, i.e., above 0.7 or 0.8.

The probable reason that relatively high reaction temperatures and space velocities cause the demetallization rate to diminish is that at higher reaction temperatures and space velocities the asphaltene molecules reside at catalyst sites for a shorter time. Desulfurization is a function of reaction temperature and of the activity of the supported active metals on the catalyst. On the other hand, demetallization activity is primarily a function of the adsorption coefficient of metal-containing molecules on the catalyst support. The employment of high reaction temperatures rapidly completes the desulfurization reaction, permitting the desulfurized asphaltene molecules to leave catalyst sites before being adsorbed onto the support where they can undergo demetallization. High space velocities cooperate with high reactor temperatures to accomplish this effect. This is apparently the mechanism whereby high second stage temperatures and space velocities, by permitting rapid desulfurization, prevent excessive removal of nickel and vanadium which is contained in refractory porphyrin structures.

Tables 3 and 4 show the characteristics of first stage pseudoboehmite hydrodesulfurization products obtained by the hydrodesulfurization under various conditions of a Ceuta reduced crude of the type described in Table 1. This first stage product constitutes the type of feed charged to the second pseudoboehmite stage of this invention, following flashing off of gases from the first stage effluent and introduction of a scrubbed recycle or make-up hydrogen stream.

TABLE 3

Product of First Pseudoboehmite Stage Operated at 700°F. (371°C.), 0.5 LHSV 5,000 SCF $H_2$/Bbl (90 SCM/100L)

|  | Charge-Stock | 1000 psi (70Kg/cm$^2$) | 500 psi (35Kg/cm$^2$) | 250 psi (17.5Kg/cm$^2$) |
|---|---|---|---|---|
| Sulfur, % by wt. | 2.07 | 0.61 | 0.86 | 1.47 |
| Nickel, ppm wt. | 32 | 20 | 28 | 32 |
| Vanadium, ppm wt. | 254 | 151 | 159 | 216 |

TABLE 4

Product of First Pseudoboehmite Stage Operated at 1000 psig (70 Kg/cm$^2$), 0.5 LHSV, 5000 SCF $H_2$/Bbl (90 SCM/100L)

|  | Charge-Stock | 700°F. (371°C.) | 720°F. (382°C.) |
|---|---|---|---|
| Sulfur, % by wt. | 2.07 | 0.61 | 0.41 |
| Nickel, ppm weight | 32 | 20 | 21 |
| Vanadium, ppm weight | 254 | 151 | 139 |

Table 5 shows the results obtained when hydrodesulfurizing whole Ceuta petroleum crude oil in a first stage only with a pseudoboehmite catalyst and also with a non-pseudoboehmite commercial residual oil hydrodesulfurization catalyst.

TABLE 5

SINGLE STAGE HYDRODESULFURIZATION OF CEUTA CRUDE AT 500 psi (35 Kg/cm$^2$), 700°F. (371°C.), 5000 SCF $H_2$/Bbl (90 SCM/100L)

|  | Pseudoboehmite Catalyst | | Non-Pseudoboehmite Catalyst |
|---|---|---|---|
| Supported Metals, weight % | 0.5Ni,1Co,8Mo | 0.5Ni,1Co,8Mo | 4.5Ni,12Mo,5Ti |
| LHSV, Hr$^{-1}$ | 0.5 | 1 | 1 |
| On-Stream Time, Hours | 205–301 | 8–72 | 359–407 |
| Desulfurization, weight % | 62 (0.78)[1] | 61 (1.04)[1] | 39 (1.69)[1] |
| Demetallization, weight % | 32 (167)[2] | 34 (230)[2] | 20 (134)[2] |
| Deasphalting, weight % | 20 | 3 | 12 |
| %Demetallization/ | | | |

TABLE 5-continued

SINGLE STAGE HYDRODESULFURIZATION OF CEUTA CRUDE AT
500 psi (35 Kg/cm$^2$), 700°F. (371°C.), 5000 SCF H$_2$/Bbl (90 SCM/100L)

|  | Pseudoboehmite Catalyst | | Non-Pseudoboehmite Catalyst |
|---|---|---|---|
| %Desulfurization | 0.52 | 0.56 | 0.51 |

[1] Sulfur remaining in the oil
[2] Metals remaining in the oil

Table 5 shows that although the ratio of demetallization to desulfurization in the first stage is the same with the pseudoboehmite and non-pseudoboehmite catalysts, the extent of desulfurization in the first stage is considerably greater with the pseudoboehmite catalyst.

Figure 2:
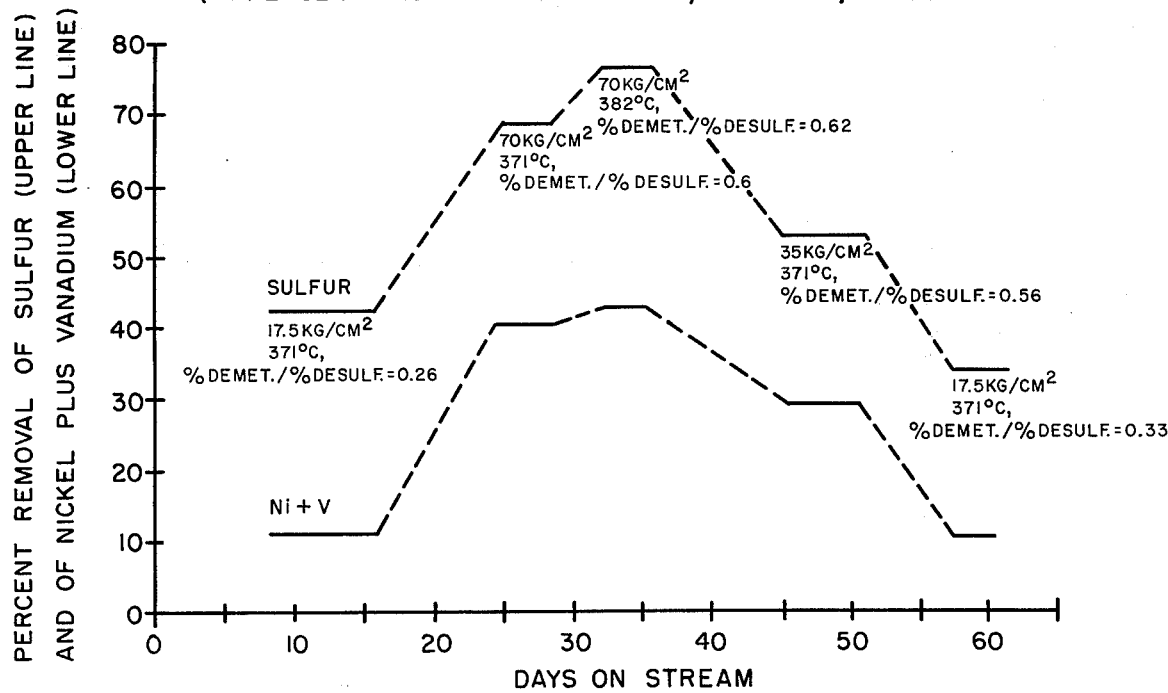

FIG. 2 shows the percent removal of sulfur and of nickel plus vanadium from 50 percent reduced Ceuta crude at various processing conditions in a first stage employing a pseudoboehmite catalyst. Although FIG. 2 shows that desulfurization is highest at the higher pressures tested, it also shows that demetallization is disadvantageously also highest at the higher pressures tested, and the highest demetallization to desulfurization ratios occur at the high desulfurization pressure levels. On the other hand, it is seen that at low operating pressures, although the degree of desulfurization falls, the degree of demetallization falls to a greater extent, so that the lowest ratios of demetallization to desulfurization occur at low operating pressures. The advantageous effect of obtaining low demetallization to desulfurization ratios is induced to the greatest extent by lowering operating pressures below 500 psi (35 Kg/cm$^2$), especially as low as 250 psi (17.5 Kg/cm$^2$), or lower. FIG. 2 shows that while lowering the operating pressure from 1000 to 250 psi (70 to 17.5 Kg/cm$^2$) reduced sulfur removal by one-half, it reduced metals removal by three-fourth.

Because it is advantageous to operate the first stage under process conditions which reduce demetallization activity, and coincidently also reduce desulfurization activity, the oil retains a high metals level and a high sulfur level as it enters the second stage of the process of the present invention. It is therefore advantageous to operate the second stage under conditions to enhance desulfurization, while continuing to inhibit demetallization, permitting the second stage to compensate for the intentional inhibition of desulfurization in the first stage.

It has now been discovered that the pseudoboehmite catalyst in second stage operation exhibits an unusually high desulfurization activity, which is twice that of a non-psuedoboehmite commercial residual oil hydrodesulfurization catalyst in the second stage. Unlike first stage operation, the pseudoboehmite catalyst can operate in the second stage at a high desulfurization level while the level of demetallization is concomitantly so low that the pseudoboehmite catalyst almost completely rejects metals in the second stage. This is unlike the characterisitcs of the pseudoboehmite catalyst in the first stage where, as shown in FIG. 2, reduction of demetallization activity occurs at the expense of desulfurization activity.

The discovery of the high activity of the pseudoboehmite catalyst in the second stage is illustrated in Table 6 which compares the results of second stage tests performed at two space velocities with both a pseudoboehmite catalyst and a commercial non-pseudoboehmite catalyst when treating the residual oil effluent of a non-psuedoboehmite first stage.

TABLE 6

Second Stage Operation
(Non-pseudoboehmite Catalyst Employed in First Stage)

|  | 0.5% Ni, 1% Co, 8% Mo Supported on Pseudoboehmite | | Similar Metals Supported on Non-Pseudoboehmite Commercial Catalyst | |
|---|---|---|---|---|
| Product Sulfur, Weight % | 0.5 | 0.3 | 0.5 | 0.3 |
| LHSV, Hr$^{-1}$ in second stage | 2 | 1 | 1.0 | 0.5 |

Table 6 shows that at the two space velocities tested, use of the pseudoboehmite catalyst in the second stage advantageously produced a second stage product of a given sulfur level at twice the space velocity that was required to achieve the same sulfur level with a commercial non-pseudoboehmite catalyst. Therefore, when employing the pseudoboehmite catalyst in the second stage the volume of pseudoboehmite catalyst that would be required is only one-half of the required volume of commercial non-pseudoboehmite catalyst so that by employing pseudoboehmite catalyst in the second stage there is a considerable savings in catalyst loading, i.e., the space velocity can be higher in the second stage than in the first stage. Furthermore, since the second stage pseudoboehmite catalyst rejects metals almost completely, unlike a non-pseudoboehmite commercial catalyst in the second stage, the pseudoboehmite second stage catalyst will be deactivated only by coke formation and can therefore be regenerated by simple in situ combustion or by solvent extraction, and then reused. In contrast, regeneration of a metals-deactivated catalyst is considerably more difficult and generally not commercially feasible. Therefore, use of pseudoboehmite as a second stage catalyst involves both a lower initial cost and a lower maintenance cost, as compared to a non-pseudoboehmite catalyst.

FIGS. 3 and 4 illustrate the second stage activity of the pseudoboehmite catalyst in response to changes in certain process parameters. FIG. 3 illustrates the effect of reactor residence time on desulfurization and shows very little advantage in desulfurization level is obtained by extending reactor residence time beyond one hour, advantageously indicating a high space velocity (low catalyst inventory) process. FIG. 4 illustrates the effect of reaction pressure on desulfurization and shows that there is very little advantage in desulfurization level obtained by employing pressures above 1,200 or 1,500 psi (84 or 105 Kg/cm$^2$), advantageously indicating a low pressure process.

In the first stage of the process of this invention, the least refractory sulfur and metal constituents are removed from the resin and asphaltene molecules in the crude or reduced crude feed oil. The least refractory sulfur and metal constituents tend to be disposed on the periphery of the residual molecules as contrasted to more refractory sulfur and metal constituents which are imbedded within polycondensed aromatic ring structures in the core of these molecules. Removal of the least refractory sulfur and metal constituents tends to be accompanied by dealkylation of the polycondensed aromatic ring structures by removal of peripheral alkyl groups.

With the dealkylation of the residual molecules in the first stage, the resulting residual molecules possess a reduced steric hindrance against contact of the refractory polycondensed aromatic ring nucleus with the catalyst in the second stage. Therefore, in the second stage, which must accomplish removal of the refractory sulfur, i.e., the sulfur which is more deeply imbedded in the aromatic core, the residual molecules are sterically capable of abutting more closely against the pseudoboehmite support due to the absence of interfering peripheral alkyl groups. It was indicated above that in the second stage, desulfurization tends to occur more readily than demetallization. Data presented above indicate that employment of an elevated temperature and an elevated space velocity in the second stage permits the residual molecules to be reacted relatively quickly and leave the second stage pseudoboehmite catalyst in a desulfurized condition wihout allowing sufficient contact time for removal of a significant quantity of metals in the second stage. The quantity of metals removed in the second stage was found to be so low that the second stage catalyst life is limited by coke formation rather than metals deposition and therefore the second stage catalyst can be regenerated by simple combustion methods.

As indicated above, desulfurization is a function of the reaction temperature and the activity of the catalytic metals on the surface of the catalyst, while demetallization is a function of the adsorption coefficient of residual molecules on the catalyst support and is determined by the opportunity afforded to the residual molecules to be adsorbed on the catalyst support. Therefore, by accomplishing relatively rapid second stage desulfurization, rapid departure of molecules from the alumina support of the catalyst prevents sufficient time for adsorption of residual molecules on the alumina support, in turn preventing hydrocracking of nickel- and vanadium-containing porphyrins and thereby greatly inhibiting demetallization. Because the molecules reacting in the second stage are relatively devoid of steric hindrance, the primary deactivation factor in the second stage is coke formation while the primary deactivation factor in the first stage, which treats sterically hindered residual molecules, is metals deposition. Because the life of the first stage catalyst is metals limited, the first stage catalyst cannot be regenerated by simple combustion.

It was shown above that the ratio of demetallization to desulfurization in the first stage is lowest at low hydrogen pressures. Data presented below show that second stage desulfurization is improved by increasing hydrogen pressure. Therefore, the preferred mode of operating the process of this invention is by employing countercurrent hydrogen flow to enhance hydrogen pressure in the second stage relative to hydrogen pressure in the first stage.

FIG. 5 shows a flow diagram of a two stage residual oil hydrodesulfurization process employing a nickel-cobalt-molybdenum on pseudoboehmite catalyst in both stages and wherein countercurrent hydrogen flow is employed in order to enhance the hydrogen pressure in the second stage relative to the hydrogen pressure in the first stage. Reduced first stage hydrogen pressure results from pressure drop and dilution of the hydrogen with by-product gases formed during earlier passage of the hydrogen through the second stage. It is also due to interstage partial depressurization.

As shown in FIG. 5, crude or reduced crude oil is charged through line 10 downwardly through first pseudoboehmite fixed catalyst bed stage 12. Effluent from the first stage is removed through line 14, passed to a flash chamber 15 from which liquid product is pumped by pump 16 through line 18 to second pseudoboehmite catalyst stage 20. Effluent from the second stage is removed through line 22, passed to flash chamber 23 from which desulfurized liquid product is removed through line 25.

Hydrogen is charged to the process through line 24 and is mixed in line 26 with recycle hydrogen from line 28. The hydrogen is passed through second stage 20 preferably downflow with respect to a fixed catalyst bed and cocurrently with respect to the oil feed. Hydrogen, having a reduced pressure due to pressure drop and diluted with by-product gases, is flashed from desulfurized product in flash chamber 23, removed through line 30 and then passed downflow through first stage 12, cocurrently with respect to oil flow. Hydrogen effluent is removed from the first stage effluent in flash chamber 15 and passed through line 32 to gas scrubber 34 to remove contaminating by-product gases such as hydrogen sulfide, ammonia and gaseous hydrocarbons through line 36 prior to recycle of hydrogen through line 28.

FIG. 5 illustrates an advantageous mode of hydrogen flow wherein hydrogen flow is countercurrent with respect to oil flow in the overall process but wherein hydrogen flow is cocurrent with respect to oil flow in each stage. If desired, the hydrogen can also flow countercurrently with respect to oil flow within each stage. Countercurrent flow in one or both stages may be preferred.

The data of Table 7 further illustrate the particular importance of low hydrogen pressure in first stage operation with a pseudoboehmite catalyst as compared to a non-pseudoboehmite catalyst.

Table 7 compares the ratio of demetallization to desulfurization at various pressures in a first stage when employing a non-pseudoboehmite catalyst and a pseudoboehmite catalyst.

TABLE 7

| | First Stage Demetallization to Desulfurization Ratio | | | |
|---|---|---|---|---|
| | 250 psi (17.5 Kg/cm²) | 500 psi (35 Kg/cm²) | 1000 psi (70 Kg/cm²) | 2000 psi (140 Kg/cm²) |
| Non-Pseudo-boehmite Catalyst | 0.51 | 0.71 | 1 | 1.05 |
| Pseudo-boehmite Catalyst | 0.25 | 0.56 | 0.6 | about 1 |

As shown in Table 7, the ratio of demetallization to desulfurization in a first stage is considerably lower at pressures below 1000 or 2000 psi (70 or 140 Kg/cm²)

when employing a pseudoboehmite catalyst as compared to a non-pseudoboehmite catalyst. While the demetallization to desulfurization ratios for the two catalysts are about the same at a pressure of 2000 psi (140 Kg/cm$^2$), Table 7 shows that the demetallization to desulfurization ratios for the pseudoboehmite catalyst decrease markedly with decreasing pressure and become particularly low at pressures below 500 psi (35 Kg/cm$^2$). The decline in demetallization to desulfurization ratio at low pressures is not as great when employing a non-pseudoboehmite catalyst. Table 7 demonstrates that in first stage operation at relatively low pressures, the pseudoboehmite catalyst accomplished desulfurization with particularly low accompanying demetallization rates. This illustrates the advantage to be achieved by passing feed hydrogen through the first stage after it passes through the second stage.

Figure 6:
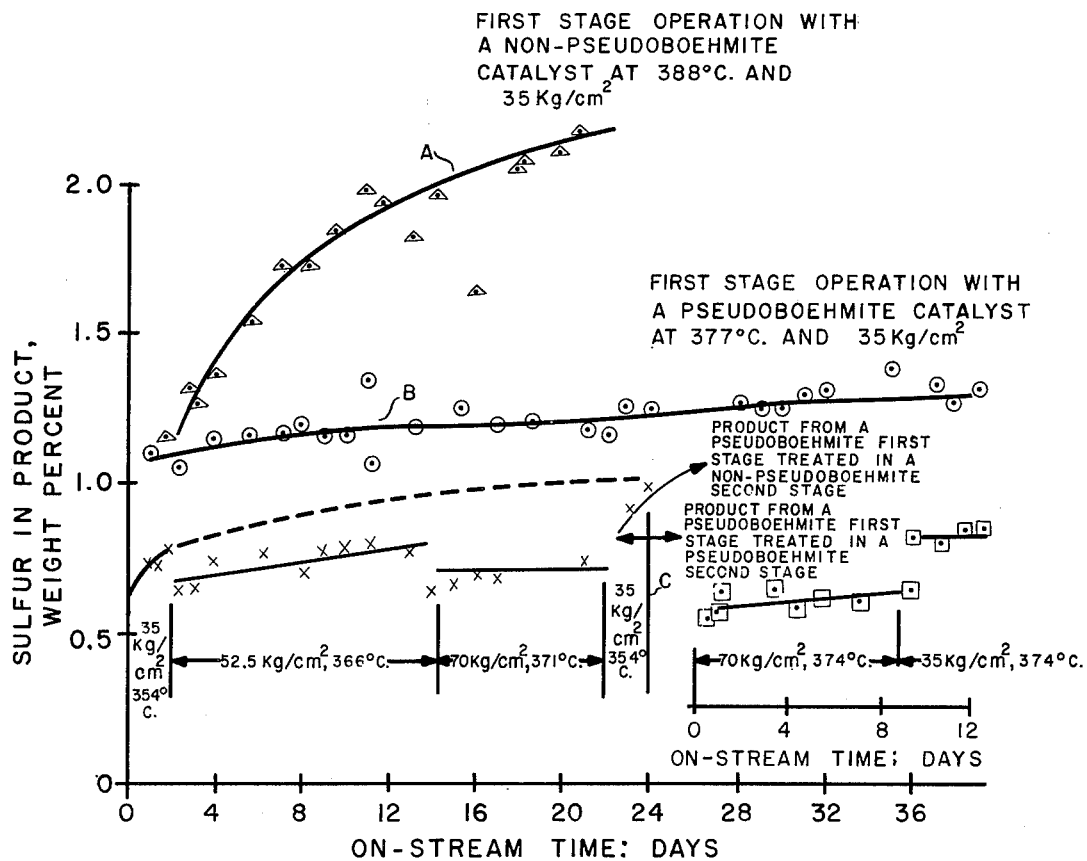

Referring to FIG. 6, curve A shows first stage aging data employing a non-pseudoboehmite first stage catalyst at 730°F. (388°C.) and 500 psi (35 Kg/cm$^2$). Curve B shows first stage aging data employing a pseudoboehmite catalyst at 710°F. (377°C.) and 500 psi (35 Kg/cm$^2$). All curves disposed below curve B represent second stage operation at conditions indicated in FIG. 6, with all curves to the left of vertical line C representing product from a pseudoboehmite first stage operation treated in a non-pseudoboehmite second stage, while all data to the right of vertical line C represent product from a pseudoboehmite first stage operation treated in a pseudoboehmite second stage.

It is shown in FIG. 6, at line A, that rapid aging occurs with a non-pseudoboehmite catalyst at low pressure in first stage operation. The rapid aging is probably due primarily to coke formation on the catalyst causing rapid loss of the initially high first stage non-pseudoboehmite desulfurization rate. On the other hand, curve B, which demonstrates activity of a pseudoboehmite catalyst in the first stage, exhibits an equally high start-of-run activity but shows a relatively low aging rate probably due to the smaller metals removal accompanying desulfurization and to a very high tolerance to coke formation.

FIG. 6 shows that when a pseudoboehmite catalyst is employed in the first stage, a higher desulfurization activity is imparted to a pseudoboehmite catalyst in the second stage than is imparted to a non-pseudoboehmite catalyst in the second stage due to a greater pressure response on the part of the pseudoboehmite second stage catalyst. FIG. 6 shows, in second stage data obtained at temperatures in the 690° to 705°F. (366° to 374°C.) region, that the non-pseudoboehmite catalyst and the pseudoboehmite second stage catalyst are both sensitive to pressure changes at nearly constant temperature, with increases in pressure increasing desulfurization activity in the second stage with each catalyst. However, FIG. 6 shows that at a given pressure, the pseudoboehmite catalyst has a higher activity in the second stage than the non-pseudoboehmite catalyst. For example, at 1000 psi (70 Kg/cm$^2$), the pseudoboehmite catalyst produces a second stage product having a lower sulfur level than the non-pseudoboehmite catalyst in the second stage at 1000 psi (70 Kg/cm$^2$). Also, at 500 psi (35 Kg/cm$^2$), the pseudoboehmite catalyst after 12 days of aging produced about the same second stage product sulfur level as that produced using a non-pseudoboehmite catalyst in the second stage at the higher pressure of 750 psi (52.5 Kg/cm$^2$) and at the same age of 12 days. Therefore, FIG. 6 shows that the improved desulfurizing activity obtained by employing the pseudoboehmite catalyst in the first stage can be compounded by employing the pseudoboehmite catalyst in a second stage in series by employing a relatively higher hydrogen pressure in the second stage than in the first stage. A higher hydrogen pressure is achieved in accordance with this invention by passing hydrogen countercurrently from the second stage to the first stage. FIG. 6 shows that the advantage in second stage operation that can be achieved by countercurrent hydrogen flow is greater with a pseudoboehmite second stage catalyst than with a non-pseudoboehmite second stage catalyst.

We claim:
1. A process for hydrodesulfurizing a metal-containing hydrocarbon feed oil at a temperature between 600° and 1,000°F., and a hydrogen pressure between 50 and 5,000 psi comprising passing said feed oil and hydrogen through first and second hydrodesulfurization zones in series with interzone removal of gaseous by-products, the catalyst in said first and second zones comprising Group VI-B and Group VIII metals supported on alumina said alumina being prepared by drying and calcining a crystalline alumina hydrate having 1.2 to 2.6 mols of water of hydration per mol of alumina, and maintaining the temperature in said second zone higher than the temperature in said first zone.
2. The process of claim 1 wherein said crystalline alumina hydrate includes a minor amount of alumina hydrate selected from the group consisting of bayerite, gibbsite and mixtures thereof.
3. The process of claim 1 wherein the feed oil contains at least 20 parts per million by weight of nickel plus vanadium.
4. The process of claim 2 wherein the feed oil contains at least 100 parts per million by weight of nickel plus vanadium.
5. The process of claim 2 wherein the hydrogen pressure is below 1,500 psi.
6. The process of claim 2 wherein the hydrogen pressure is 250 to 500 psi.
7. The process of claim 2 wherein the second zone is operated at a temperature of above 710° to 750°F. and at a liquid hourly space velocity of above 0.5.
8. The process of claim 1 wherein the second zone is operated at a temperature above 750°F. and at a liquid hourly space velocity of above 0.7.
9. The process of claim 1 wherein the space velocity is higher in the second zone than in the first zone.
10. The process of claim 1 wherein the quantity of catalyst in the second zone is less than the quantity of catalyst in the first zone.
11. The process of claim 1 including regeneration of the second zone catalyst.
12. The process of claim 1 wherein oil flows from the first zone to the second zone and hydrogen flows from the second zone to the first zone.
13. The process of claim 1 wherein the hydrogen pressure is higher in the second zone than in the first zone.
14. The process of claim 1 wherein oil flows from the first zone to the second zone, hydrogen flows from the second zone to the first zone, and hydrogen and oil flow cocurrently in each of said zones.
15. The process of claim 1 wherein the feed oil is a residual petroleum oil.

\* \* \* \* \*

UNITED STATES PATENT OFFICE
CERTIFICATE OF CORRECTION

PATENT NO. : 3,940,330
DATED : February 24, 1976
INVENTOR(S) : H. Beuther, S. W. Chun and A. A. Montagna It is certified that error appears in the above-identified patent and that said Letters Patent are hereby corrected as shown below:

Col. 12, lines 1 each of claims 4, 5, 6 and 7, should refer to claim "1" and not claim "2"

Signed and Sealed this eleventh Day of May 1976

[SEAL]

Attest:

RUTH C. MASON
Attesting Officer

C. MARSHALL DANN
Commissioner of Patents and Trademarks